United States Patent [19]

Welker

[11] 4,031,595

[45] June 28, 1977

[54] HIGH PRECISION INCREMENTAL DISTANCE MEASURING SYSTEM

[75] Inventor: Helmut Welker, Jamestown, N.Y.

[73] Assignee: Bausch & Lomb Incorporated, Rochester, N.Y.

[22] Filed: Sept. 2, 1975

[21] Appl. No.: 609,863

[52] U.S. Cl. .......................... 250/237 G; 33/125 C; 356/169
[51] Int. Cl.² .......................................... H01J 3/14
[58] Field of Search ...... 250/231 R, 231 SE, 237 R, 250/237 G; 356/169, 170, 172; 33/125 R, 125 A, 125 C

[56] References Cited

UNITED STATES PATENTS

| 3,816,003 | 6/1974 | Litke | 356/169 |
|---|---|---|---|
| 3,833,303 | 9/1974 | Burns et al. | 250/237 G |
| 3,867,037 | 2/1975 | Litke | 356/172 |
| 3,899,255 | 8/1975 | Meier | 33/125 C |

*Primary Examiner*—David C. Nelms
*Attorney, Agent, or Firm*—Frank C. Parker; DeWitt M. Morgan

[57] ABSTRACT

Measuring apparatus using the vernier fringe concept of measurement to provide a precise digital numeric indication of displacement between two relatively movable members. The apparatus includes an accurately ruled grating or scale, a housing for supporting the scale, a transducer and a transducer support housing. The housing is secured to a flat mounting surface provided on one of the two relatively movable members while the transducer support housing is secured to the other of the two relatively movable members. The transducer includes an index grating supported on a movable carriage which rides on the scale and is held in engagement with the scale by a cantilever spring element. In order to insure readings accurate to 0.0001 inch, the housing is designed so that it holds the scale in close conformity with the flat mounting surface against which the housing is secured. Further, an alignment bracket arrangement is provided to carefully position the transducer and, hence, the cantilever spring relative to the scale.

17 Claims, 4 Drawing Figures

HIGH PRECISION INCREMENTAL DISTANCE MEASURING SYSTEM

CROSS-REFERENCE TO RELATED APPLICATION

This application is related to application Ser. No. 609,862 filed Sept. 2, 1975 of Alexander E. Martens for High Resolution Distance Measuring Apparatus.

BACKGROUND OF THE INVENTION a. Field of the Invention

This invention relates to incremental photoelectric measuring apparatus using either the Moire or the vernier fringe concept of measurement.

b. Description of the Prior Art

The main element in an incremental photoelectric measuring system is an accurately ruled grating or scale of the desired length. This scale is commonly of glass or steel and has a precisely known number of lines per unit of length (for example, 500 equal lines and spaces per inch).

In a Moire fringe type system a short length of scale, commonly known as the index grating, having the same line structure as that provided on the scale is superimposed on the scale at a slight angle thereto such that the respective line structures cross. This produces a pattern of dark and light bands perpendicular to the lines on the scale as the lines on the index grating fall on lines or spaces of the scale. This integrated image is what is known as a Moire fringe pattern. The spacing of the Moire fringes can be adjusted by rotating the index grating relative to the scale about an axis which is perpendicular to both the scale and the index grating. In operation, when the index grating is translated along the scale, normal to the direction of the lines on the scale, the fringe pattern travels at right angles to the direction of movement. By passing a light beam through both the scale and the index grating, the movement of this fringe pattern may be converted into electrical signals by the use of photo-electric sensors. The output from such photo-electric sensors can be, for example, summed, shaped and amplified and then fed to an electronic digital display counter. The signals from the photo-electric sensors may also be used to give an indication of the direction of motion.

In vernier fringe type systems, the pattern of lines and spaces provided on the index grating is not the same as that provided on the scale. In one type of vernier system, the index grating has either slightly fewer or slightly more lines per inch than the scale. For example, a scale with 500 lines per inch could have an index grating with either 497 or 503 lines per inch. In this arrangement the index grating is superimposed over the scale such that the lines on the index grating are parallel to the lines on the scale. This produces a pattern of dark and light bands parallel to the lines on the scale as the lines on the index grating fall on the lines or spaces of the scale. This emigrated image is what is known as a vernier fringe pattern. The spacing of the vernier fringes is determined by the difference in pitch between the scale and the index grating. For example, a 500 lines per inch scale and a 503 lines per inch index grating generates 3 vernier fringes per inch. In operation, when the index grating is translated along the scale, normal to the direction of the lines on the scale, the fringe pattern travels parallel to the direction of movement. By passing a light beam through both the scale and the index grating, the movement of the fringe pattern may, by the use of photo-electric sensors etc., be converted into electrical signals to indicate both the amount and direction of movement.

A system using the Moire fringe concept of measurement is described in U.S. Pat. No. 3,833,303 to Richard H. Burns et al. The apparatus disclosed therein includes a scale, a transducer or reading head and a transducer support housing. The reading head includes an index grating supported on a carriage. The carriage includes a first set of scale engaging surfaces or pads which are designed to ride on the face of the scale and a second set of scale engaging surfaces or pads which are designed to ride on the edge of the scale which is ground and polished. These respective sets of pads are simultaneously held in engagement with the scale face and scale edge by a cantilever spring which is secured to the transducer support housing and connected to the carriage by a ball-and-socket arrangement. The scale is supported in a housing securable to one of two relatively movable members. The transducer support housing, which is secured to the other of the two relatively movable members, is positioned relative to the scale housing by a temporary alignment bracket.

The above described instrument is accurate to 0.0005 inches. However, it has been found that the arrangement of parts prevents its use when accuracy of 0.0001 inches is required. The limitation in accuracy is due, at least in part, to lack of conformity of the scale to the surface against which the housing is mounted. It has also been determined that for 0.0001 inch accuracy the end of the cantilever spring element fixed to the transducer support housing has to be more accurately positioned relative to the scale than the arrangement disclosed in U.S. Pat. No. 3,833,303 permitted.

To overcome the above described drawbacks, the present invention provides scale housing designed to insure that the scale is held in close conformity with the surface against which the scale housing is mounted. Further, the present invention insures that the transducer support housing and, hence, the mount for the cantilever spring element is carefully positioned relative to the scale.

SUMMARY OF THE INVENTION

Apparatus for providing a precise digital numeric indication of displacement between two relatively movable members. The apparatus includes a scale, a housing for supporting said scale, a transducer, a transducer support and means for coupling the transducer to the transducer support. The housing includes a first and second pair of parallel rails. The first set of rails is adapted for engagement with a mounting surface provided on one of the two relatively movable members. The scale is mounted against the second set of rails. In order to insure conformity of the scale to the surface against which the housing is mounted, the cross-sectional configuration of the housing in the area of the two sets of rails is designed to insure that the second set of rails is substantially parallel to the first set of rails along the length of the housing when the housing is secured to the mounting surface. Further, the apparatus also includes a structure for temporarily coupling the transducer support to the scale housing and, in conjunction with structure provided on the transducer support, for accurately positioning the transducer support relative to the scale.

DESCRIPTION OF THE PREFERRED EMBODIMENT

Measuring apparatus 11 includes an elongated housing 13, a scale 15, a transducer or reading head 17 and a transducer support housing or reading head casting 19.

Figure 2:
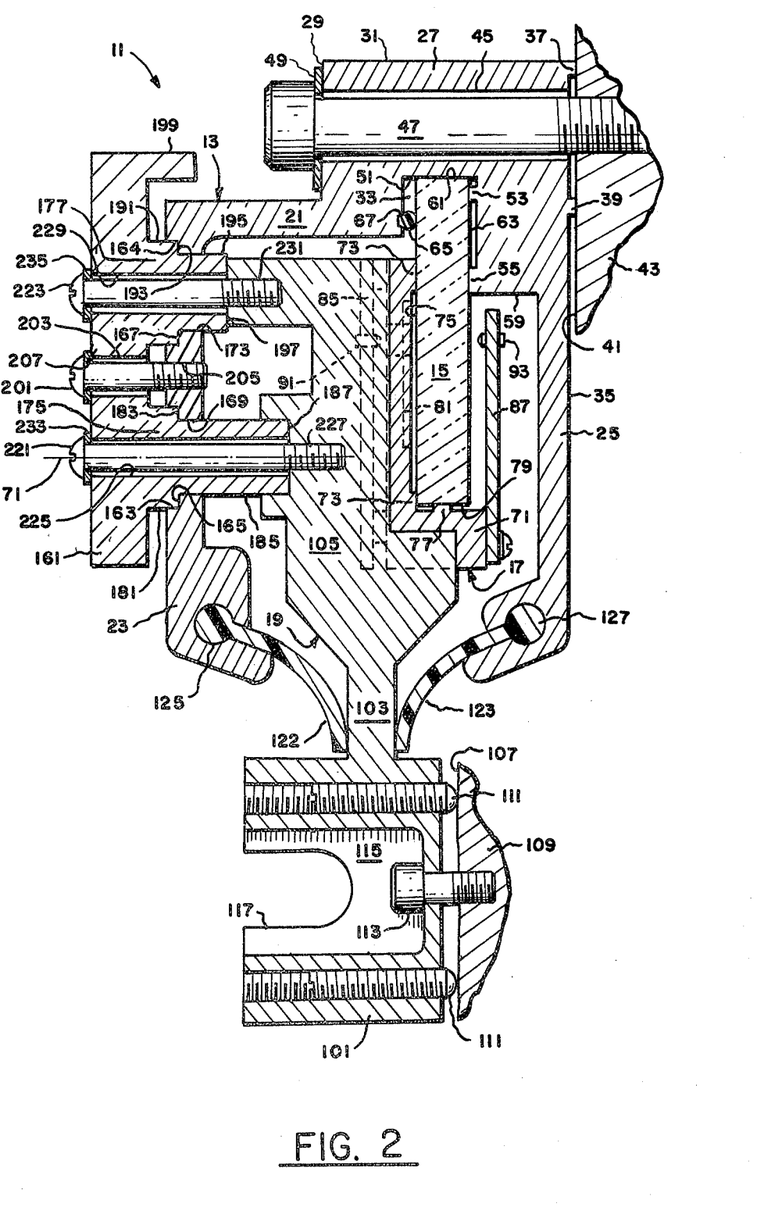
FIG. 2 is a sectional view of the preferred embodiment taken along line 2—2 of FIG. 1.

As is evident from inspection of FIG. 2, housing 13 has a generally U-shaped cross-section including central section 21 and depending legs 23 and 25. Central section 21 has an upstanding portion 27, a face 29, a top surface 31 and a scale receiving channel 33. Housing 13 also includes a back surface 35 on which is provided a pair of parallel rails 37 and 38 that are adapted for engagement with mounting surface 41 provided on first relatively movable member 43. Movable member 43 may, for instance, be the table of a milling machine.

Upstanding portion 27 is provided with a plurality of bolt holes 45 which are evenly spaced along the housing 13. As is evident from inspection of FIG. 2, when housing 13 is viewed in cross section, bolt holes 45 are located between rails 37 and 39. This arrangement is preferred because rails 37 and 39, which are formed by extrusion, are parallel to each other though not necessarily straight over the entire length of housing 13. With bolt holes 45 located between rails 37 and 39, the force exerted by bolts 47 on upstanding portion 27 will hold rails 37 and 39 in engagement with and conform them to surface 41. A washer 49 is interposed between bolt 47 and face 29. Alternatively, a bolt with a large head could be used.

As housing 13 is an aluminum extrusion it is not possible to hold surface 35 directly against and in conformity with surface 41 because extrusion surfaces are, generally, not flat but tend to assume a barrel shaped configuration. Further, also because housing 13 is an extrusion, the tolerances on legs 23 and 25 become greater as the distance from central section 23 increases.

Scale receiving channel 33 includes an extruded surface 51 and a pair of extruded parallel rails 53 and 55. Surface 51 cooperates with scale edge 61 to, as viewed in FIG. 2, vertically position scale 15 within housing 13. Scale face 63 is held in engagement with and forced to conform to rails 53 and 55 by rubber cord 65 which is held in position by channel 67. Rails 53 and 55 are required in place of a single flat surface because such a single surface would, when extruded, have a slightly bowed configuration.

In order to insure that face 63 of scale 15 conforms, as close as possible to surface 41, it is necessary that rails 53, 55 be parallel to rails 37, 39 over the length of housing 13. In the preferred embodiment this is accomplished by, when viewing housing 13 in cross section, locating rail 53 relative to rail 39 such that the two are approximately aligned and solidly interconnected with each other in a direction substantially perpendicular to the surface defined by rails 37 and 39. Preferably, again when viewing housing 13 in cross section, rail 53 is located between rails 37 and 39 (e.g., rail 53 is located between the plane of surface 31 and a second parallel plane which intersects and includes the bottom edge of rail 39). Rail 53 may be located below the second parallel plane. However, as the vertical spacing increases, there will be a greater chance that rails 37, 39 and rails 53, 55 will not be parallel over the length of housing 13 since warpage or twisting in an extrusion such as housing 13 increases as the cross-sectional dimensions increase. The nature of extrusions is such that closed space dimensions (e.g., thicknesses of solid sections) are very uniform throughout the length of the extrusion. However, cross-sectional configurations such as U-shaped housing 13 warp and twist non-uniformly as their size increases.

Parallelism over the length of housing 13 between rails 53, 55 and rails 37, 39 is also facilitated by: (1) keeping the area, as viewed in cross-section, between surface 35, rails 53, 55, surface 59 and the plane of surface 51 solid; and (2) vertically locating bolt holes 45 as close as possible to surface 51 without distorting or breaking through surface 51. As surface 51 is, when viewed as illustrated in FIG. 2, above rail 53 it will, preferably, be vertically positioned between rails 37 and 39.

The transducer or reading head 17 includes a carriage 71 on which are provided a first set of pads 73 that, in the assembled instrument, engage and side on scale face 75. Carriage 71 also includes a second set of pads 77 for engagement with scale edge 79. As those skilled in the art will appreciate, the respective planes defined by pads 73 and pads 77 are inclined to each other at the at the same angle that scale face 75 is inclined with respect to scale edge 79. Scale face 75 is parallel to scale face 63 and scale edge 79 is parallel to scale edge 61.

Carriage 71 is provided with a rectangular opening 81 in which is received index grating 83. Index grating 83, like scale 15, is made of glass but has a slightly different line frequency than that provided on scale 15 so as to produce a vernier fringe. Opening 81 positions index grating 83 so that it is parallel to and spaced from scale face 75 when pads 73 are in engagement with scale face 75 and pads 77 are in engagement with scale edge 79.

As is evident from inspection of FIG. 2, transducer 17 also includes first and second circuit boards 85 and 87. Board 85, which is of insulating material, supports four photo-electric sensors such as illustrated at 91 and associated electronics (not shown). Board 87, also of insulating material, supports four light emitting diodes such as illustrated at 93. Cut-out 95 provided in carriage body 71 permits photo-electric sensors 91 to sense the light from light emitting diodes 93.

Transducer support housing or reading head casting 19 includes a base portion 101, a central section 103 and a bracket portion 105. Base portion 101 is secured to second machine mounting surface 107 provided on member 109 which, for example, may be the bed of a milling machine. Members 43 and 109 are movable relative to each other.

In order to insure that the spacing and alignment between base portion 101 and surface 107 is maintained so as, in turn, to insure that bracket portion 105 remains in the correct spacing and alignment relative to scale 15, jack screws 111 are provided. Jack screws 111 not only insure that the relative positions of base portion 101 and surface 107 are maintained but also facilitate mounting when surface 107 is, as illustrated in FIG. 2, not smooth. After jack screws 111 are brought into engagement with surface 107, base portion 101 is secured to member 109 via bolts 113.

Figure 1:
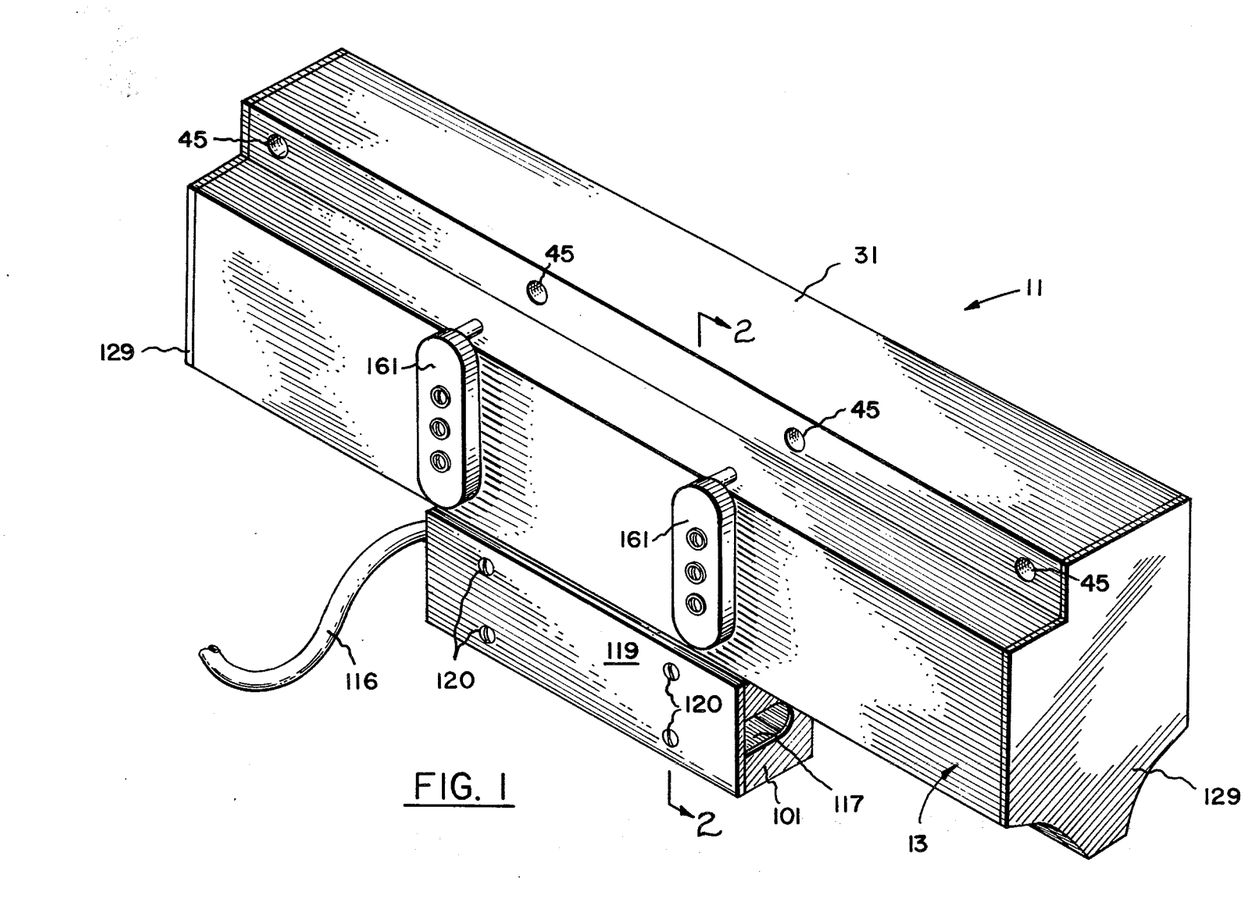
FIG. 1 is a perspective view of the preferred embodiment of the apparatus.

The hollow interior 115 of base portion 101 serves as a splice box between the electrical wires (not shown) coming from reading head 17 and the electrical cable 116 from the display console (also not shown). Cutouts 117 facilitate entry of cable 116 into interior 115. As illustrated in FIG. 1, interior 115 is closed by a cover 119 held in place by screws 120.

Central section 103 of transducer support housing 19 has, similar to the transducer support housing illustrated in U.S. Pat. No., 3,833,303 to Burns et al, a cross-section in the form of a top plain view of a canoe and includes a through hole 121 for the wires (not shown) from reading head 17. The canoe configuration is desirable in order to minimize the opening between seals 122 and and 123 which are received in slots 125 and 127 provided in, respectively, legs 23 and 25 of housing 13. Seals 122 and 123 are desirable in order to prevent dirt, machine chips or coolant fluids from entering the interior of housing 13 and damaging, for instance, scale 15, or reading head 17. As shown in FIG. 1, the ends of housing 13 are sealed by plates 129.

Figure 3:
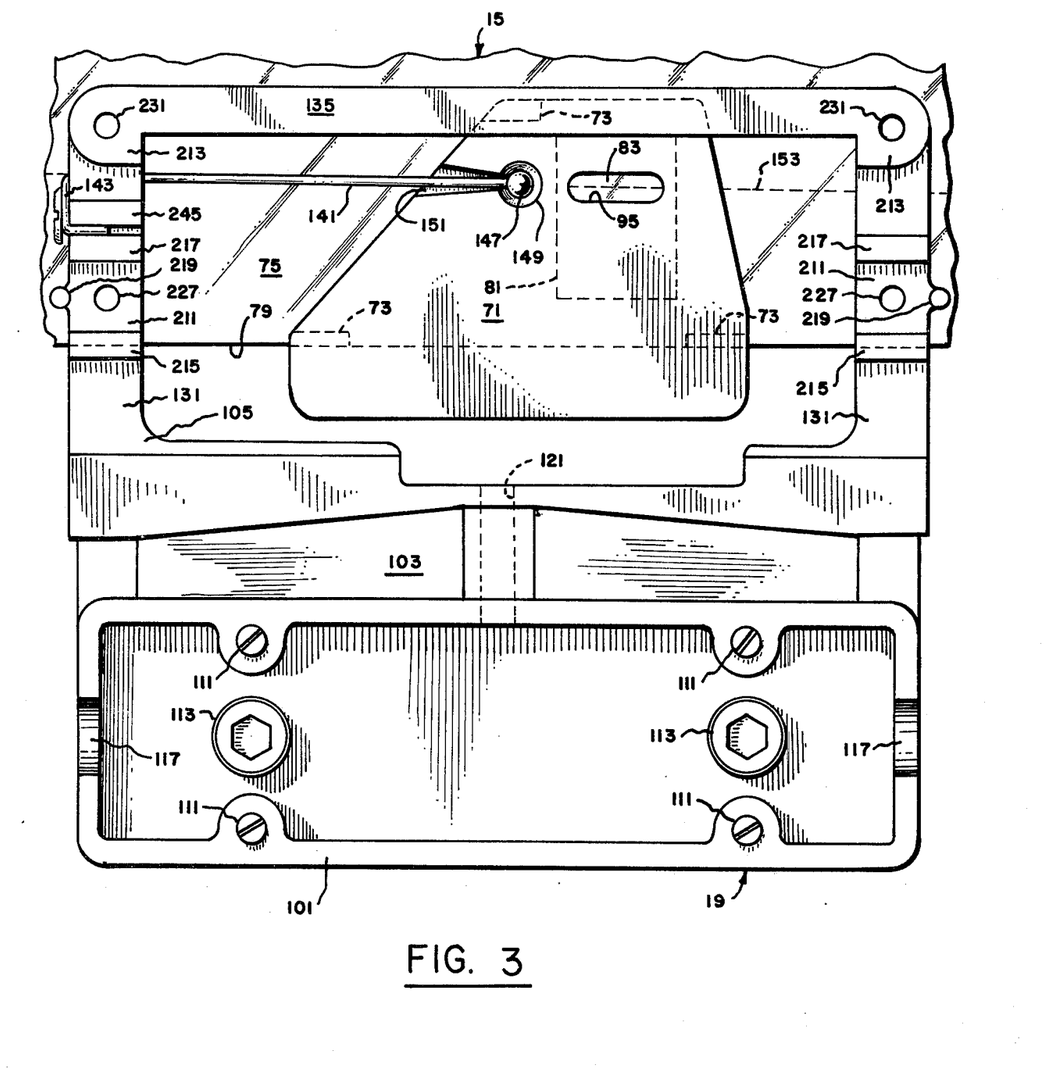
FIG. 3 is a front view of the transducer, transducer support housing and the connection therebetween with the housing and circuit board removed for purposes of clarity.

As is best illustrated in FIG. 3, bracket portion 105 of transducer support housing 19 includes two upstanding legs 131 which are interconnected by cross bar 135 to form a rigid frame-like structure.

To connect transducer support housing 19 with transducer 17 a cantilever wire spring 141 is provided. As is evident from inspection of FIGS. 3 and 4, spring 141 is secured at end 143 to leg 131 by screw 145. The opposite end of spring 141 carries a ball 147 which, in the assembled instrument, is received in socket-like recess 149 provided in carriage 71. When spring 141 is assembled to leg 131 and connected to carriage 71 (via the ball-and-socket arrangement provided by ball 147 and recess 149), transducer 17 is connected to transducer support housing 19 and, hence, to member 109. Spring 141 is formed so that it exerts a force which simultaneously urges pads 73 into engagement with scale face 75 and pads 77 into engagement with scale edge 79. The ball-and-socket arrangement permits the necessary degree of freedom between transducer 17 and transducer support housing 19 so that pads 73 and 77 will remain in contact with, respectively, scale face 75 and scale edge 79 even though the vertical and horizontal position of transducer support housing 19 may vary with respect to scale 15 as transducer 17 moves relative to scale 15. At the same time, the ball-and-socket arrangement virtually eliminates movement between carriage body 71 and transducer support housing 19 in the direction of travel of transducer 17 relative to scale 15. Tapered cut-out area 151 provides clearance between spring 141 and carriage body 71 to prevent interference therebetween if the position of transducer support housing 19 varies with respect to scale 15 as transducer 17 moves along scale 15.

While scale edge 61 is parallel to scale edge 79 and scale face 63 is parallel to scale face 75, those skilled in the art will appreciate that scale 15, over its entire length, will not be completely unstrained in bending when it is mounted in channel 33. That is, the length of scale 15 as measured along edge 61 and the length of scale 15 as measured along edge 79 will not be the same as they were in the free state. The length, as measured along neutral axis 153 will, however remain constant. Therefore, in order to obtain reading accuracies of 0.0001 inches, it has been determined that photocells 91 and light emitting diodes 93 should be located in a plane which is perpendicular to scale face 75 and which is, at least, in close proximity with neutral axis 153. Preferably this plane should be tangent to neutral axis 153. Additionally, the longitudinal axis of spring 141 should be straight and lie in the same tangent plane as photocells 91 and light emitting diodes 93.

To insure that spring 141 is straight and tangent to neutral axis 153 it is necessary that transducer support housing 19 be accurately positioned relative to scale face 75 and scale edge 79 and that end 143 of spring 141 be accurately positioned on leg 131 of bracket portion 105.

Fixing transducer support housing 19 relative to scale face 75 and scale edge 79 is accomplished by: (1) a pair of alignment brackets 161 which are positioned a fixed distance from both scale mounting surface 51 and rails 53, 55; and (2) carefully interfacing transducer support housing 19 with brackets 161. Accurately positioning brackets 161 relative to surface 51 and rails 53, 55 insures, due to the parallelism between scale edges 61 and 79 and scale faces 63 and 75, that brackets 161 are accurately positioned relative to both scale face 75 and scale edge 79. This, together with careful interfacing between brackets 161 and transducer support housing 19, accurately positions transducer support housing 19 relative to scale face 75 and scale edge 79.

To accurately position each bracket 161 relative to rails 53 and 55, leg 23 of housing 13 is provided, as is evident from inspection of FIG. 2, with a pair of recesses 163 and 164 having mounting surfaces 165 and 167 both of which lie in the same plane and are accurately referenced with respect to the plane defined by rails 53 and 55. Surfaces 165 and 167 are machined using a jig which is held in engagement with surface 51 and with rails 53 and 55. In addition to fixing each bracket 161 in a plane which is parallel to the plane defined by rails 53 and 55, it is also necessary that each bracket 161 be fixed relative to surface 51. This is accomplished by providing, for each bracket 161, a through opening 169 in leg 23 the centerline 171 of which is fixed relative to surface 51. Openings 169 are also formed by machining using a jig which engages surface 51. Centerlines 171 define a plane which is parallel to surface 51. An additional opening 173 is also provided for each bracket 161 though its size and spacing from surface 51 is not as critical as the size and spacing of opening 169.

Each bracket 161 includes a pair of stepped bosses 175 and 177. Boss 175 has a base portion 181, a flat surface 183, an end portion 185 and an end surface 187. Similarly, boss 177 includes a base portion 191, a flat surface 193, an end portion 195 and an end surface 197. To prevent bosses 175 and 177 from being reversed relative to recesses 163 and 164, bracket 161 is also provided with a projection 199.

Base portion 181 is of smaller diameter than recess 163 and base portion 191 is of smaller diameter than recess 164. This permits surfaces 183 and 193, which lie in the same plane, to seat against corresponding surfaces 165 and 167. End portion 185 is dimensioned such that is is snugly received within opening 169, while end portion 195 loosely lossely received within opening 173. Finally, the distance between surfaces 187 and 197 is fixed.

Surfaces 183, 193 are held in engagement with surfaces 165, 167 by a screw 201 which passes through opening 203 provided in bracket 161 and engages threaded opening 205 provided in leg 23 of housing 13. Washer 207 prevents screw 201 from damaging bracket 161.

As is evident from inspection of FIG. 3, bracket portion 105 of transducer support housing 19 is provided with a first pair of surfaces 211 which lie in the same plane and a second pair of surfaces 213 which lie in a second plane parallel to the plane of surfaces 211 and spaced therefrom a distance equal to the spacing between surfaces 187 and 197. Thus, engagement of surfaces 211 and 213 with corresponding surfaces 187, 197 accurately positions bracket 105 of transducer support housing 19 relative to rails 53 and 55. To fix the position of transducer support housing 19 relative to surface 51, each leg 131 of bracket 105 is provided with a pair of bosses 215 and 217 which closely engage and cooperate with end portion 185 of each bracket 161 to thereby fix the position of transducer support housing relative to surface 51 of housing 13. Bosses 219 laterally position transducer support housing 19.

Surfaces 211 and 213 are held in engagement with surfaces 187 and 197 by machine screws 221 and 223. Screw 221 passes through opening 225 provided in bracket 161 and engages threaded opening 227. Likewise, screw 223 passes through opening 229 and engages threaded opening 231. Washers 233 and 235 prevent screws 221 and 223 from damaging bracket 161.

Figure 4:
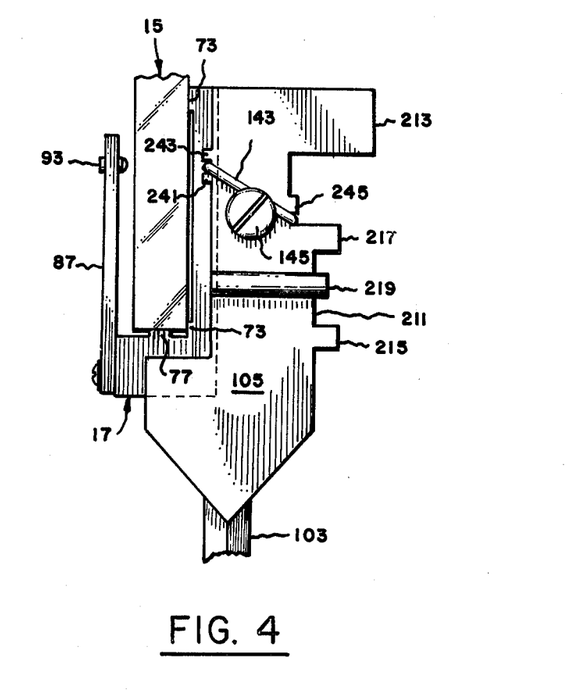
FIG. 4 is a partial end view of the transducer support housing, transducer and scale.

The fixed end 143 of spring 141 is, in the orientation illustrated in FIGS. 3 and 4, vertically positioned relative to bosses 215 and 217 by means of a pair of bosses 241, 243 provided on leg 131 and a slot formed by boss 217 and boss 245. With bracket 161 secured to housing 13 and bracket portion 105 secured, in turn, to bracket 161, transducer housing 19 and, hence, the fixed end 143 of spring 141 is correctly positioned relative to scale 15. Jack screws 111 are then brought into engagement with surface 107 and base portion 101 secured to member 109 via bolts 113. Brackets 161 are then removed and openings formed in leg 23 covered with a plate (not shown).

In operation, with light emitting diodes 93 energized, any movement of the vernier fringe pattern created by the integrated image effects of the line structures on both scale 15 and index grating 83 is sensed by photoelectric sensors 91 and converted into electrical signals. The change in intensity of the light on photo-electric sensors indicates the passage of each fringe and hence measures the relative travels of index grating 83 with respect to scale 15. The output from sensors 91 may be amplified, shaped and summed by appropriate circuitry (not shown) provided on either insulating board 85 or in the electric digital display unit (not shown) or both. Such circuitry forms no part of the present invention.

Whereas the drawings and accompanying description have shown and described a preferred embodiment of the present invention it should be apparent to those skilled in the art that various changes may be made in the form of the invention without effecting the scope thereof.

What is claimed is:

1. In measuring apparatus securable to first and second relatively movable members for determining the relative displacement therebetween, wherein said first movable member has a substantially flat mounting surface, wherein said apparatus includes a scale, means for supporting said scale, transducer means, transducer support means and means for interconnecting said transducer with said transducer support means, wherein said scale has an edge and a face, and wherein the improvement comprises:
  a. a first pair of rails provided on said scale supporting means for engagement with said mounting surface;
  b. said scale supporting means including means for positioning means for securing said scale supporting means to said mounting surface, said positioning means locating said securing means between said first rails so as to insure that said first rails engage and conform to said mounting surface when said scale supporting means is secured to said mounting surface; and
  c. a second pair of rails provided on said scale supporting means, said second rails cooperating with said scale face to position said scale on said scale supporting means, at least one of said second rails and one of said first rails being approximately aligned and solidly interconnected in a direction substantially perpendicular to the surface defined by said first rails when said scale supporting means is viewed in cross-section.

2. The apparatus as set forth in claim 1 wherein, when said scale supporting means is viewed in cross-section, said one of said second rails lies between the outer edges of said first rails.

3. The apparatus as set forth in claim 1 wherein said scale supporting means has a scale edge locating means, said scale edge locating means cooperating with said scale edge to position said scale on said scale supporting means, said scale edge locating means being located between said first rails when said scale supporting means is viewed in cross-section.

4. The apparatus as set forth in claim 3 wherein said positioning means is a plurality of bolt holes spaced along the length of said scale supporting means.

5. The apparatus as set forth in claim 4 wherein said bolt holes are located adjacent to said scale edge locating means.

6. In measuring apparatus securable to first and second relatively movable members for determining the relative displacement therebetween, wherein said apparatus includes a scale, means for supporting said scale, transducer means, transducer support means, and means for coupling said transducer with said transducer support means, wherein said scale has an edge and a face, and wherein the improvement comprises:
  a. a first pair of rails provided on said scale supporting means for engagement with said first relatively movable member;
  b. a second pair of rails provided on said scale supporting means for cooperating with said scale face to locate said scale on said scale supporting means;
  c. said scale supporting means including means for positioning means for securing said scale supporting means to said first relatively movable member, said positioning means locating said securing means between said first rails so as to insure that said first rails are in engagement with said first relatively movable member; and d. a scale edge locating means provided on said scale supporting means for cooperating with said scale edge to locate said scale on said scale supporting means, said scale edge locating means being located, when said scale supporting means is viewed in cross-section, between said first rails.

7. In measuring apparatus securable to both a first member having a substantially flat mounting surface and to a second member movable relative to said first member for determining the relative displacement therebetween, said apparatus including a scale, means for supporting said scale, a transducer means, a transducer support means and means for coupling said transducer support means and said transducer, said scale having an edge and a face, wherein the improvement comprises:
 a. a first pair of rails provided on said scale supporting means for engagement with said mounting surface;
 b. a second pair of rails provided on said scale supporting means, at least one of said second rails lying between said first rails when said scale supporting means is viewed in cross-section; and
 c. said scale supporting means including locating means cooperable with means for securing said scale supporting means to said mounting surface, said locating means being positioned between said first rails so as to insure that said first rails conform to said mounting surface when said scale supporting means is secured to said mounting surface.

8. The apparatus as set forth in claim 7 wherein, when viewed in cross-section, at least one of said first rails lies between said second rails and the area between said at least one of said first rails and said second rails is solid.

9. The apparatus as set forth in claim 7 wherein said locating means is a plurality of bolt holes.

10. The apparatus as set forth in claim 7 wherein said surface of said scale is held in conformity with said second rails and said scale supporting means includes a surface against which said scale edge is located, said scale edge locating surface lying between said first rails when said scale supporting means is viewed in cross-section.

11. In apparatus securable to first and second relatively movable members for use in measuring the relative displacement therebetween, wherein said apparatus includes a scale, means for holding said scale, a transducer means, transducer support means, means for coupling said transducer support means and said transducer means and means for coupling said transducer support means to said holding means until said holding means is secured to said first member and said transducer support means is secured to said second member, wherein said holding means includes at least one scale engaging means, and wherein the improvement comprises:
 a. said holding means having mounting means which is spaced from and fixed relative to said scale engaging means, said mounting means including means for defining a mounting surface which lies in a plane which is parallel to and accurately referenced with respect to said scale engaging means;
 b. said coupling means having first positioning means and second positioning means, said second coupling positioning means being accurately spaced relative to said first coupling positioning means, said first coupling positioning means cooperating with said mounting means to locate said coupling means in a position spaced from and fixed relative to said scale engaging means; and
 c. said transducer support means having locating means, cooperable with said second coupling positioning means, whereby, when said transducer support means is secured to said coupling means said transducer support means is spaced from and fixed relative to said scale engaging means.

12. In apparatus securable to first and second relatively movable members for use in measuring the relative displacement therebetween, said apparatus including a scale, means for supporting said scale, a transducer means, a transducer support means, means for interconnecting said transducer support means and said transducer means, wherein said scale has a face and a neutral axis, and wherein the improvement comprises:
 said transducer support means including means for positioning said interconnecting means so that said interconnecting means is substantially straight and lies in a surface which is normal to said scale face a said surface being in close proximity to and parallel with a surface which is tangent to said neutral axis of said scale.

13. The apparatus as set forth in claim 12 wherein said transducer means includes signal emitting means and signal sensing means, said signal emitting means and said signal sensing means being located on said transducer means such that they lie in said surface of said interconnecting means.

14. The apparatus as set forth in claim 13 wherein said surface of said interconnecting means is tangent to said neutral axis of said scale.

15. In apparatus securable to first and second relatively movable members for use in measuring the relative displacement therebetween, wherein said apparatus includes a scale, means for holding said scale, a transducer means, transducer support means, means for coupling said transducer support means and said transducer means and means for coupling said transducer support means to said holding means until said holding means is secured to said first member and said transducer support means is secured to said second member, wherein said holding means includes first and second scale engaging means, and wherein the improvement comprises:
 a. said holding means having mounting means which is spaced from and fixed relative to said scale engaging means, said mounting means including means for defining a mounting surface which lies in a plane which is parallel to and accurately referenced with respect to said first engaging means, said mounting means further including means defining a second plane which is parallel to and spaced from said second scale engaging means;
 b. said coupling means having first positioning means and second positioning means, said second coupling positioning means being accurately spaced relative to said first coupling positioning means, said first coupling positioning means cooperating with said mounting means to locate said coupling means in a position spaced from and fixed relative to said scale engaging means; and
 c. said transducer support means having locating means, cooperable with said second coupling positioning means, whereby, when said transducer support means is secured to said coupling means said transducer support means is spaced from and fixed relative to said scale engaging means.

16. The apparatus as set forth in claim 15 wherein said mounting means on said holding means has at least one apperture, the centerline of said apparatus defining a second plane.

17. The apparatus as set forth in claim 16 wherein said first coupling positioning means defines a surface which cooperates with said mounting surface on said holding means to accurately position said second coupling positioning means relative to said first scale engaging means.

* * * * *

UNITED STATES PATENT AND TRADEMARK OFFICE
CERTIFICATE OF CORRECTION

PATENT NO. : 4,031,595
DATED : June 28, 1977
INVENTOR(S) : Helmut Welker

It is certified that error appears in the above-identified patent and that said Letters Patent are hereby corrected as shown below:

Col. 3, line 26, delete "38" and substitute therefor --39--.

Col. 10, line 23, delete "a" and substitute therefor --,--.

Col. 11, line 5, delete "apparatus" and substitute therefor --apperture--.

Signed and Sealed this

Eleventh Day of October 1977

[SEAL]

Attest:

RUTH C. MASON
Attesting Officer

LUTRELLE F. PARKER
Acting Commissioner of Patents and Trademarks